April 29, 1947.  D. E. MEEHAN  2,419,786
BARREL STAND
Filed Nov. 28, 1944  2 Sheets-Sheet 1
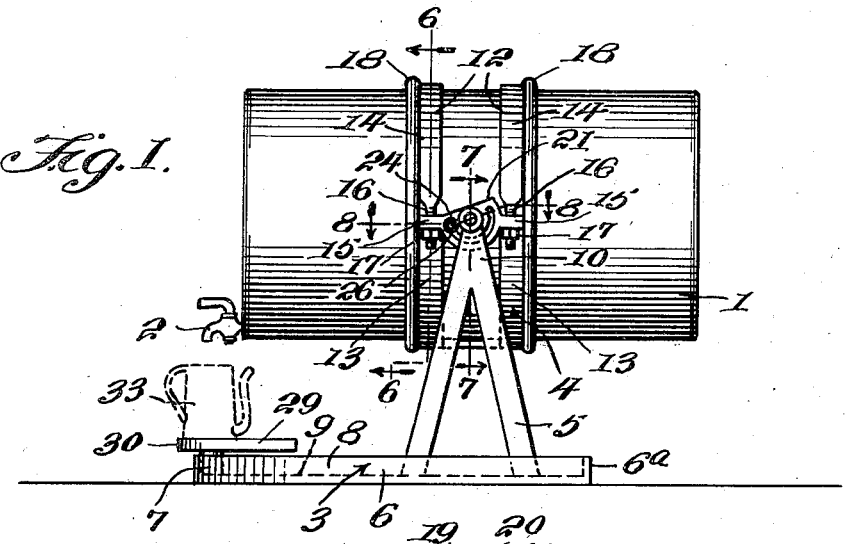
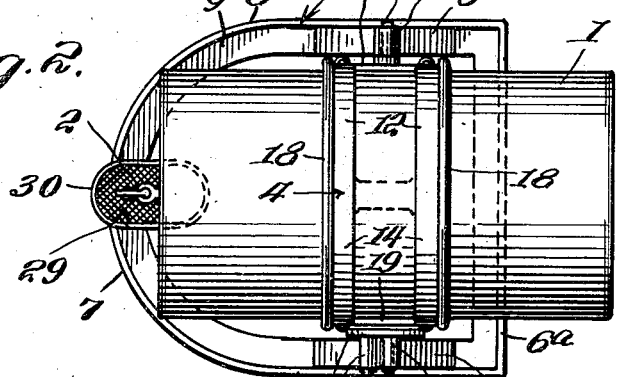
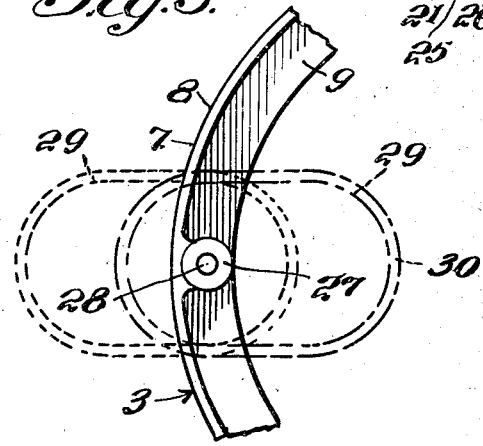
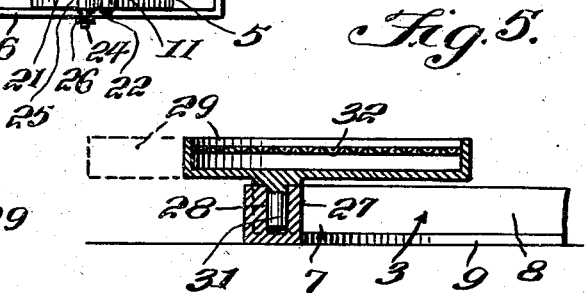
INVENTOR.
Donald E. Meehan,
BY Victor J. Evans & Co.
ATTORNEYS April 29, 1947.  D. E. MEEHAN  2,419,786
BARREL STAND
Filed Nov. 28, 1944   2 Sheets-Sheet 2
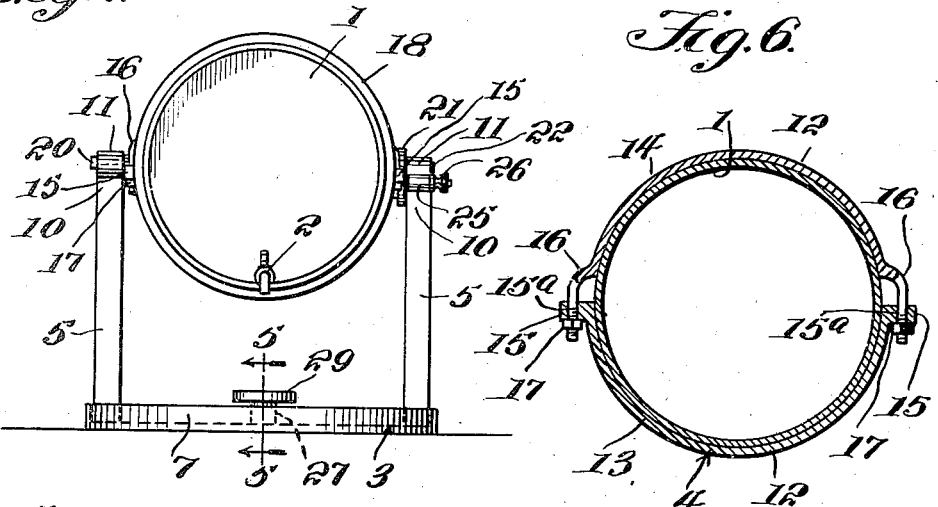
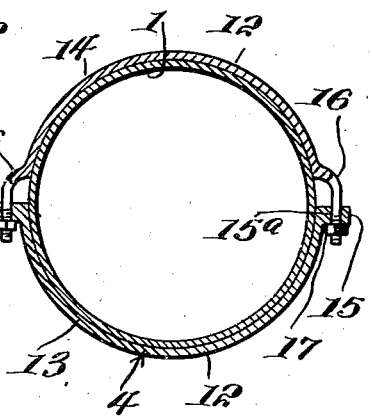
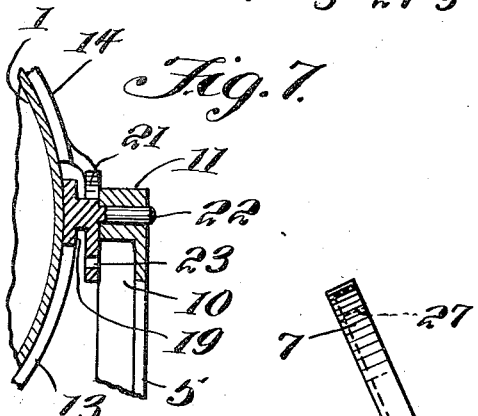
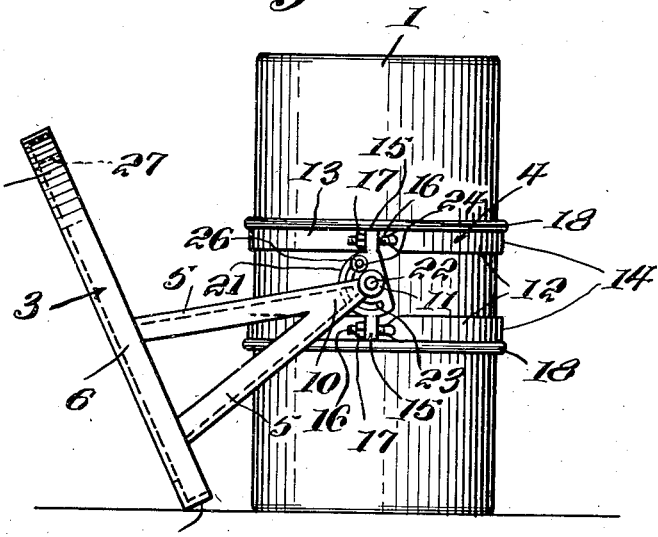
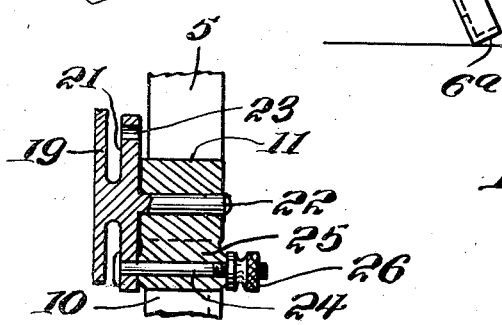
INVENTOR.
Donald E. Meehan,
BY Victor J. Evans & Co.
ATTORNEYS Patented Apr. 29, 1947

2,419,786

UNITED STATES PATENT OFFICE 2,419,786

BARREL STAND

Donald E. Meehan, Washington, D. C.

Application November 28, 1944, Serial No. 565,489

3 Claims. (Cl. 248—141)

My present invention, in its broad aspect, has to do with improvements in supporting frames for barrels, and more particularly, it is my purpose to provide a pivoted or tilting cradle for a barrel on a base having an adjustable tray for a decanter or other utensil used in receiving the contents from the barrel. In connection with the tray for the utensil used in receiving contents from the barrel, means are provided whereby the tray may be moved about a pivoted support so that the position of the utensil with reference to the spigot or dispensing bung of the barrel may be adjusted to prevent spilling and the like. In connection with the barrel cradle, I have provided means for limiting and adjusting the discharging or horizontal position of the barrel, and means for facilitating its disposition in a vertical position, and facilitating its disposition from a vertical to a horizontal position. I have also provided an improved base formed to facilitate moving a barrel from a vertical to a horizontal position, and to provide a sturdy support for the same in a horizontal or discharging position. My adjustable tray is mounted on the base.

Other and equally important objects and advantages of my invention will become apparent from the detailed description taken in connection with the accompanying drawings, but it is to be understood that I have shown and described herein a specific embodiment of my invention, and that changes may be made in the size, form, shape, construction, arrangement and disposition of parts without departing from the spirit and scope of my broad inventive concept.

In the drawings wherein I have illustrated a preferred form of my invention:

Figure 1 is a side elevation.

Figure 2 is a top plan view.

Figure 3 is a fragmentary detail of the forward end of the base with the tray removed.

Figure 4 is a front end view.

Figure 5 is a section through the tray on the line 5—5 of Figure 4.

Figure 6 is a vertical section on the line 6—6 of Figure 1.

Figure 7 is a section through the pivotal support and adjustment taken on the line 7—7 of Figure 1.

Figure 8 is a horizontal section on the line 8—8 of Figure 1, or shows the support, and Figure 9 is a side view of the barrel in a vertical position with the support in position to facilitate its movement to a horizontal discharging position.

In the drawings wherein like characters of reference are used to designate like or similar parts throughout the several views:

The numeral 1 designates a barrel which may be of any conventional type, and which has a dispensing nozzle, or faucet or tap 2 in one end or head thereof adjacent the rim. The support for the barrel comprises three principal parts, the base 3, the cradle 4, and the vertical pivoting supports 5 for the cradle.

The base 3 is formed with parallel side rails 6, a rear end rail 6a at right angles to the side rails, and a forwardly extended semi-circular forward end rail 7; these rails are preferably integrally formed with each other in a unitary structure and may be of angle iron with a vertical flange 8 and a horizontal part 9.

Rising from the base are vertical supports 5 formed with side rails meeting at a common head 10, and each head has a bearing member 11.

The barrel cradle 4 has two spaced straps 12 which go about the barrel 1 and each of which is formed with two semi-circular sections 13 and 14. Sections 13 have outstanding ears 15 with openings 15a and sections 14 have outwardly and downwardly bent threaded ends 16 extending through the openings 15a in ears 15 to receive nuts 17. The barrel may have reinforcing beads or flanges 18. Extending between section 13 between ears 15 are transverse bars 19, one of which carries a pivot pin 20, which is receivable in one of the bearing members 11. The other bar 19 has mounted thereon a semi-circular plate 21 carrying the pin 22 and an arcuate slot 23. The pin 22 is received in the other bearing member 11—see Figure 8—and the opening in the bearing to receive the pin is slightly eccentric as shown in Figure 8. A headed bolt 24 carrying a slightly eccentric sleeve 25 and a thumb nut 26 is mounted in the slot 23 with the sleeve bearing against the eccentric bearing member 11 and adjustable by nut 26 so that limited pivotal movement of the cradle with respect to the supports 5 is permitted and the cradle may be clamped in an adjusted position.

It will be noted that supports 5 are mounted near the rear end rail 6 of base 3 which rear end rail is straight. To position the barrel in the cradle or remove it from the cradle, the cradle is tilted backwardly as permitted by bolt 24 and sleeve 25 and the entire device is then tilted over as shown in Figure 9 in which case the end rail 6a functions as a supporting foot. The barrel 1 is then placed against straps 13 which are then in a vertical position, and straps 14 are applied and clamped down (or removed as the case may be to release the barrel) and the support tilted back on the base, in which case the limited pivotal movement of the barrel about the pivot pins 20 and 22 will shift the load and facilitate tilting and the barrel will then be in a horizontal dispensing position as shown in Figures 1, 2 and 4. Taking up on thumb nut 26 to set eccentric sleeve 25 will hold the barrel in the desired horizontal position.

Formed on the forward end rail 7 is a vertical cylindrical enlargement 27 with a vertical bore 28—see Figure 3. An elongated upwardly flanged tray 29 having rounded ends 30 has a depending pin 31 near one end which is receivable in the bore 28 to swingably mount the tray, which may be moved to various positions within the limits shown by dotted line positions in Figure 3 to adjust the position of the tray with reference to the dispensing spigot or nozzle or tap 2 of the barrel 1. A screen or reticulated false bottom 32 is carried by the tray for properly receiving a dispensing container 33 shown in dotted lines in Figure 1.

From the foregoing, it is believed that the operation and advantages of my invention will be apparent, but it is emphasized that interpretation of its scope should only be conclusive when made in the light of the subjoined claims.

I claim:

1. A barrel support comprising a base formed with side rails, a straight rear end rail and a curved forward end rail, vertical supporting members on the side rails of the base near the rear end rail and having bearings at their upper ends, a cradle formed with straps having detachable sections mounted on the supports and having pivot pins engaging in the bearings, an arcuate plate with an arcuate slot on the cradle, an adjustable bolt in the slot and means on the bolt for limiting the pivotal movement of the cradle, said means including an eccentric sleeve, and clamping means between the sections of the straps.

2. The invention as in claim 1 wherein the curved forward end rail is provided with means for supporting an elongated tray thereon, said tray being eccentrically mounted with respect to the base and adopted to be adjusted to variations in the dispensing position of a barrel in the support.

3. A barrel support comprising a base, vertical supporting members on the base adjacent one end, a cradle pivotally mounted on and between the supporting members for carrying a barrel, said base having a straight rear end serving as a foot when the support is tilted, the cradle having limited pivotal movement to be vertical when the base is tilted and to support the barrel horizontally when the base is not tilted, pivotal supports for the cradle, one of said supports having a semi-circular plate with an arcuate slot therein, a bolt slidable in the slot, a nut for adjusting the bolt, eccentric means associated with the bolt for adjusting the pivotal movement of the cradle to variations in the dispensing portion of the barrel and said cradle being provided with removable clamping sections to mount and demount a barrel thereon.

DONALD E. MEEHAN.

REFERENCES CITED

The following references are of record in the file of this patent:

UNITED STATES PATENTS

| Number | Name | Date |
|---|---|---|
| 515,949 | Bond | Mar. 6, 1894 |
| 324,436 | Vaughan | Aug. 18, 1885 |
| 1,542,636 | Olson | June 16, 1925 |
| 1,705,580 | Marburger | Mar. 19, 1929 |